United States Patent
Liu et al.

(10) Patent No.: US 11,121,842 B2
(45) Date of Patent: *Sep. 14, 2021

(54) METHOD AND ARRANGEMENT FOR CSI MEASUREMENT

(71) Applicant: GUANGDONG OPPO MOBILE TELECOMMUNICATIONS CORP., LTD., Dongguan (CN)

(72) Inventors: Jinhua Liu, Beijing (CN); Xinghua Song, Beijing (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/783,464

(22) Filed: Feb. 6, 2020

(65) Prior Publication Data

US 2020/0177344 A1  Jun. 4, 2020

Related U.S. Application Data

(63) Continuation of application No. 14/891,998, filed as application No. PCT/CN2013/075938 on May 20, 2013, now Pat. No. 10,594,461.

(51) Int. Cl.
*H04J 3/00* (2006.01)
*H04L 5/00* (2006.01)
(Continued)

(52) U.S. Cl.
CPC .......... *H04L 5/0053* (2013.01); *H04L 1/0026* (2013.01); *H04L 1/0027* (2013.01);
(Continued)

(58) Field of Classification Search
CPC ... H04L 5/0053; H04L 1/0026; H04L 1/0027; H04L 5/005
See application file for complete search history.

(56) References Cited

U.S. PATENT DOCUMENTS 7,737,893 B1 * 6/2010 Furman ................ G01S 5/0215
                                                          342/464
2006/0067446 A1 * 3/2006 Maeda .............. H04L 25/03171
                                                          375/349
(Continued)

FOREIGN PATENT DOCUMENTS

CN       1622493 A       6/2005
EP       2 693 679       2/2014
(Continued)

OTHER PUBLICATIONS

EPO, Extended European Search Report for EP Appl. No. 19192722.7, dated Sep. 27, 2019.
(Continued)

*Primary Examiner* — Siren Wei
(74) *Attorney, Agent, or Firm* — Hodgson Russ LLP

(57) ABSTRACT

There are proposed a base station and User Equipment UE, for determining and applying separate Channel State Information, CSI, for flexible subframes in a wireless communication system applying time division duplex, TDD. The method in a UE comprises, for a flexible subframe, receiving (103) a signal from a base station, and determining (104) whether a reference signal for CSI measurement is comprised in the received signal. The method further comprises determining (106) CSI for the flexible subframe based on the reference signal when a reference signal for CSI measurement is comprised in the received signal, and reporting (107) the determined CSI to the base station.

20 Claims, 10 Drawing Sheets

(51) Int. Cl.
  *H04L 5/14* (2006.01)
  *H04L 1/00* (2006.01)
  *H04W 24/10* (2009.01)
  *H04W 72/04* (2009.01)

(52) U.S. Cl.
  CPC ............ *H04L 5/005* (2013.01); *H04L 5/0057* (2013.01); *H04L 5/0073* (2013.01); *H04L 5/1469* (2013.01); *H04W 24/10* (2013.01); *H04W 72/0446* (2013.01)

(56) References Cited

U.S. PATENT DOCUMENTS

| | | |
|---|---|---|
| 2011/0143773 A1 | 6/2011 | Kangas |
| 2011/0176461 A1 | 7/2011 | Astely et al. |
| 2014/0269460 A1* | 9/2014 | Papasakellariou .... H04L 5/0048 370/294 |
| 2014/0334400 A1* | 11/2014 | Chen ..................... H04L 5/1469 370/329 |
| 2014/0341051 A1* | 11/2014 | Gaal ..................... H04W 24/10 370/252 |
| 2015/0256972 A1 | 9/2015 | Markhovsky |

FOREIGN PATENT DOCUMENTS

| | | | | |
|---|---|---|---|---|
| WO | WO-2012/130179 | A1 | 10/2012 | |
| WO | WO-20130/60763 | A1 | 5/2013 | |
| WO | WO-2013060763 | A1 * | 5/2013 | ........... H04L 1/0072 |

OTHER PUBLICATIONS

EPO, Extended European Search Report for EP Appl. No. 19192725.0, dated Oct. 10, 2019.
EPO, Extended European Search Report for EP Appl. No. 19192671.6, dated Sep. 27, 2019.
Title: On CSI Enhancements for Dynamic TDD; Source: Ericsson, ST-Ericsson; 3GPP TSG-RAN WG1 #73; Fukuoka, Japan (R1-132027)—May 20-24, 2013.
Title: On CSI Measurement for eIMTA; Source: Sharp; 3GPP TSG RAN WG1 Meeting #73; Fukuoka, Japan (R1-132352)—May 20-24, 2013.
Extended European Search Report for Application No. EP 13 88 5355—dated Dec. 9, 2016.
3GPP TR 36.828 v2.0.0; Technical Report; 3rd Generation Partnership Project; Technical Specification Group Radio Access Network; Further Enhancements to LTE TDD for DLUL Interference Management and Traffic Adaptation (Release 11) dated Jun. 2012.
LTE evolution for Hotspot and Indoor; CATR, MIIT (L TE-HI) dated May 2012.
3GPP TSG-RAN WG 1 #72bis; Chicago, U.S.A.; Source: Ericsson, ST-Ericsson; Title: On CSI enhancements for Dynamic TDD (RI-131456) dated Apr. 15-19, 2013.
PCT Notification of Transmittal of the International Search Report and the Written Opinion of the International Searching Authority, or the Declaration for International application No. PCT/CN2013/075938 dated Feb. 27, 2014.
USPTO, First Non-Final Office Action for U.S. Appl. No. 14/891,998, dated May 5, 2017.
USPTO, Second Non-Final Office Action for U.S. Appl. No. 14/891,998, dated Aug. 21, 2017.
USPTO, Third Non-Final Office Action for U.S. Appl. No. 14/891,998, dated Oct. 1, 2018.
USPTO, Fourth Non-Final Office Action for U.S. Appl. No. 14/891,998, dated Jun. 21, 2019.
USPTO, First Final Office Action for U.S. Appl. No. 14/891,998, dated Jan. 22, 2018.
USPTO, Second Final Office Action for U.S. Appl. No. 14/891,998, dated Feb. 1, 2019.
EPO, Communication for EP Application No. 19192725.0, dated Mar. 3, 2021.

* cited by examiner

METHOD AND ARRANGEMENT FOR CSI MEASUREMENT

CROSS-REFERENCE TO RELATED APPLICATIONS

This application is a continuation of U.S. patent application Ser. No. 14/891,998, filed on Nov. 18, 2015, which is a U.S. National Stage Entry of PCT International Application No. PCT/CN2013/075938, filed on May 20, 2013, the contents of all of which are incorporated herein by reference in their entirety.

TECHNICAL FIELD

The solutions herein relate in general to CSI (Channel State Information) measurements in wireless communication systems, and in particular to CSI measurements in wireless systems applying dynamic TDD (Time Division Duplexing).

BACKGROUND

In LTE (Long Term Evolution), two radio frame structures are supported; type 1 applicable to FDD (Frequency Divisional Duplexing), and type 2 applicable to TDD. A type 2 frame structure is illustrated in FIG. 5. In both frame structure types, each radio frame of 10 ms is divided into two half-frames of 5 ms, and each half-frame consists of five subframes of length 1 ms. In frame structure type 2, each subframe is either a downlink subframe, an uplink subframe or a special subframe giving rise to different TDD configurations, as shown e.g. in FIG. 6.

The supported uplink-downlink configurations in LTE TDD are listed in Table 1 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS, which may be seen in FIG. 5. The length of DwPTS and UpPTS is given by Table 1 subject to the total length of DwPTS, GP and UpPTS being equal to 1 ms. Each subframe consists of two slots, each of length 0.5 ms.

Uplink-downlink configurations with both 5 ms and 10 ms downlink-to-uplink switch-point periodicity are supported. In case of 5 ms downlink-to-uplink switch-point periodicity, the special subframe exists in both half-frames.

In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

In a TDD cell, a TDD configuration is characterized by both uplink-downlink configuration and special subframe configuration. Therefore, the term TDD configuration used hereinafter refers to a combination of uplink-downlink configuration. It should be noted that more TDD configurations than the ones listed in table 1 may be introduced in the future. The herein suggested solution is not limited to the existing TDD configurations, rather it is equally applicable to new configurations defined in future.

TABLE 1

| Uplink-downlink configurations | | | | | | | | | | |
|---|---|---|---|---|---|---|---|---|---|---|
| Downlink-to-Uplink Switch-point periodicity | | Subframe number | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A dynamic UL DL sub-frame configuration is being studied in 3GPP, and the Ministry of Industry and Information Technology (MIIT) of China shows great interest. In the latter, dynamic uplink downlink sub-frame configuration, referred to as "dynamic TDD" for simplicity later on, is identified as one of the key features to improve the performance in hot spot and indoor scenario for LTE TDD systems. The dynamic UL DL sub-frame configuration is also interchangeably denoted "flexible UL DL sub-frame configuration" or "dynamic TDD configuration" or "flexible TDD configuration".

With dynamic TDD, one cell can dynamically change the direction of the flexible subframes. Hereinafter, a flexible subframe configured or scheduled for downlink or uplink data transmission is referred to as a flexible downlink subframe or a flexible uplink subframe respectively, whereas a subframe that is fixed for downlink or uplink data transmission is referred to as a normal downlink subframe or normal uplink subframe. The normal downlink subframes and normal uplink subframes may also be referred to as non-flexible subframes hereinafter. As a cell can dynamically change the transmit direction of a flexible subframe, the two cells that are neighbors to each other can be configured with different uplink downlink subframe configurations. FIG. 6 exemplifies the UL to DL interference, i.e., UE to UE interference, when the two neighboring cells are configured with different UL DL subframe configurations. Cells A and B are configured with TDD subframe configuration 1 and 2 respectively. In Cell B, the normal subframes Subframe 0, 1, 5 and 6 experience interference from the downlink transmission of the corresponding downlink subframes in Cell A, while the flexible downlink subframes 3, 4, 8 and 9 experience interference from the uplink transmission of UE 1 in Cell A. The experienced interference can be quite different between the mentioned normal and flexible downlink subframes.

CSI (Channel State Information) measurements include measurements of CQI (Channel Quality Indicator), PMI (Pre-coding Matrix Indicator) and RI (Rank Indicator). In LTE Rel-8/9, the CSI measurements are based on CRSs (Cell specific Reference Signals) which are transmitted in each downlink subframe across the whole frequency band. In Rel-10/11, new reference signals are introduced for CSI measurement, i.e. CSI-RS (Channel State Information-Reference Signal). In LTE-Rel-12, a non-backward compatible NCT (New Carrier Type) will be introduced. For NCT, the density of CRSs will be reduced and will only used for frequency and time tracking and will not be used for data demodulation or CSI measurement. The downlink CQI, PMI and rank could be based on the existing CSI-RS. However, there are also possibilities to introduce other kinds of reference signals for the purpose of CSI measurement. This herein suggested solution is applicable for both cases, which is one of its advantages.

In presence of dynamic TDD, the normal downlink subframes and the flexible downlink subframes experience different interferences. In the normal downlink subframes, a scheduled UE experiences the traditional DL to DL interference. In the flexible downlink subframes, a scheduled UE may experience either or both of the DL to DL interference and the UL to DL interference depending on whether the neighboring cells schedule the same/corresponding subframe for downlink or uplink data transmission. For a certain user scheduled in a flexible downlink subframe, the experienced interference situation may be quite different from that of a user scheduled in a normal downlink subframe. Using the universal CSI measurement for both normal and flexible downlink subframes may result in link adaptation performance degradation for the UE in general.

Further, generally, for fixed TDD subframes, i e subframes where the direction of transmission is not variable from one radio frame to another, a UE may apply information provided in advance, e g in a measurement request, for locating time-frequency resource elements (TFREs) where reference signals are transmitted, upon which the measurements are to be performed. Such information may, for example, be specification of a measurement bandwidth and/or a measurement pattern. However, for flexible TDD subframes, where the transmission direction may change from one frame to another, such information may not be available to, or useful for the UE, as the UE may not know in advance whether the flexible TDD subframe is an UL or DL subframe. This may, for example, be the case when a measurement occasion of a requested measurement falls in the flexible TDD subframe. Further, the reference signals available for CSI measurements in the flexible TDD subframe may vary depending e.g. on carrier type and/or measurement configuration. For example, a CRS or a CSI-RS may be transmitted in the flexible TDD subframe, or, if the UE is assigned to a carrier of a new carrier type, there may be no reference signals or fewer reference signals transmitted in the flexible TDD subframe. There is thus a need for a mechanism that enables a UE to perform adequate CSI measurements regardless of what is the actual configuration of the flexible TDD subframe.

SUMMARY

It is therefore an object of the present disclosure to provide mechanisms that enable a UE to perform adequate CSI measurements in flexible TDD subframes.

According to a first aspect, this object is achieved by a method performed by a User Equipment, UE, for determining separate channel state information, CSI, for a flexible subframe in a wireless communication system applying time division duplex, TDD. The method comprises, for or in a flexible subframe, receiving a signal from a base station. The method further comprises determining whether a reference signal for CSI measurement is comprised in the received signal, and further comprises determining CSI for the flexible subframe, based on the reference signal, when a reference signal for CSI measurement is comprised in the received signal. The method further comprises reporting the determined CSI to the base station.

According to a second aspect, this object is achieved by a method performed by a base station operable in a wireless communication system applying time division duplex, TDD, for receiving separate CSI related to flexible subframes. The method comprises receiving a report of CSI from a UE in an uplink resource configured to be shared between reports of CSI related to flexible subframes and reports of CSI related to non-flexible subframes. The method further comprises determining whether the reported CSI is related to flexible subframes or to non-flexible subframes, and scheduling a transmission in a flexible subframe based on the received CSI when the received CSI is related to flexible subframes.

According to a third aspect, this object is achieved by a UE for determining separate CSI for a flexible subframe in a wireless communication system applying TDD. The UE comprises a receiving unit, configured to receive a signal from a base station in a flexible subframe. The UE further comprises a determining unit, configured to determine whether a reference signal for CSI measurement is comprised in the received signal; and further configured to determine CSI for the flexible subframe, based on the reference signal, when a reference signal for CSI measurement is comprised in the received signal. The UE further comprises a reporting unit, configured to report the determined CSI to the base station.

According to a fourth aspect, this object is achieved by a base station operable in a wireless communication system applying TDD, for receiving separate CSI related to flexible subframes. The base station comprises a receiving unit, configured to receive a report of CSI from a UE in an uplink resource configured to be shared between reports of CSI related to flexible subframes and reports of CSI related to non-flexible subframes. The base station further comprises a determining unit, configured to determine whether the reported CSI is related to flexible subframes or to non-flexible subframes; and further a scheduler, configured to schedule a transmission in a flexible subframe, based on the received CSI, when the received CSI is related to flexible subframes.

The above methods and devices enable a UE to perform adequate CSI measurements regardless of what is the actual configuration of the flexible TDD subframe. The methods and devices may be implemented in different embodiments, described further below.

BRIEF DESCRIPTION OF DRAWINGS

The invention will now be described in more detail by means of exemplifying embodiments and with reference to the accompanying drawings, in which.

DETAILED DESCRIPTION

In the following paragraphs, different aspects of the invention will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments may depart from these specific details.

Methods and nodes are described herein, for measuring and reporting CSI in presence of dynamic TDD. By differentiating the CSI measurement and reporting associated with normal and flexible downlink subframes, respectively, a difference between the experienced interferences for these different types of subframes may be considered e.g. when scheduling. Tentative CSI measurement schemes are proposed, which may be performed in dependence of whether a reference signal for CSI measurement can be detected or not. Such schemes enable efficient CSI measurement and ensure the network flexibility. Such flexibility can reduce the limit on the scheduling and improve link adaptation performance.

CSI for normal and flexible downlink subframes, respectively, may be measured and reported separately by a UE. Accordingly, a base station may then schedule the transmission in a downlink subframe based on the CSI report corresponding to the subframe type.

An exemplifying embodiment of a method performed by a User Equipment, UE, in a wireless communication system will now be described with reference to FIG. 1. The method is suitable for determining separate channel state information, CSI, for a flexible subframe in a wireless communication system applying time division duplex, TDD. By flexible subframe is here meant a subframe which may be configured either for downlink or for uplink communication in different cells, depending e.g. on which TDD configuration that is applied. That is, in a first cell, the subframe may be configured for downlink communication, but in a neighboring cell, the same subframe may be configured for uplink communication. An example of this may be seen in table 1, where e.g. subframe 3 is configured for uplink communication in configurations #0, 1, 3, 4 and 6; and configured for downlink communication in configurations #2 and 5. Thus, subframe 3 is a flexible subframe when different configurations may be used in neighboring cells. The term "separate" is used here to emphasize that it is CSI which is valid for one or more flexible subframes, and not a regular CSI, valid for all subframes or valid for non-flexible subframes.

Figure 1:
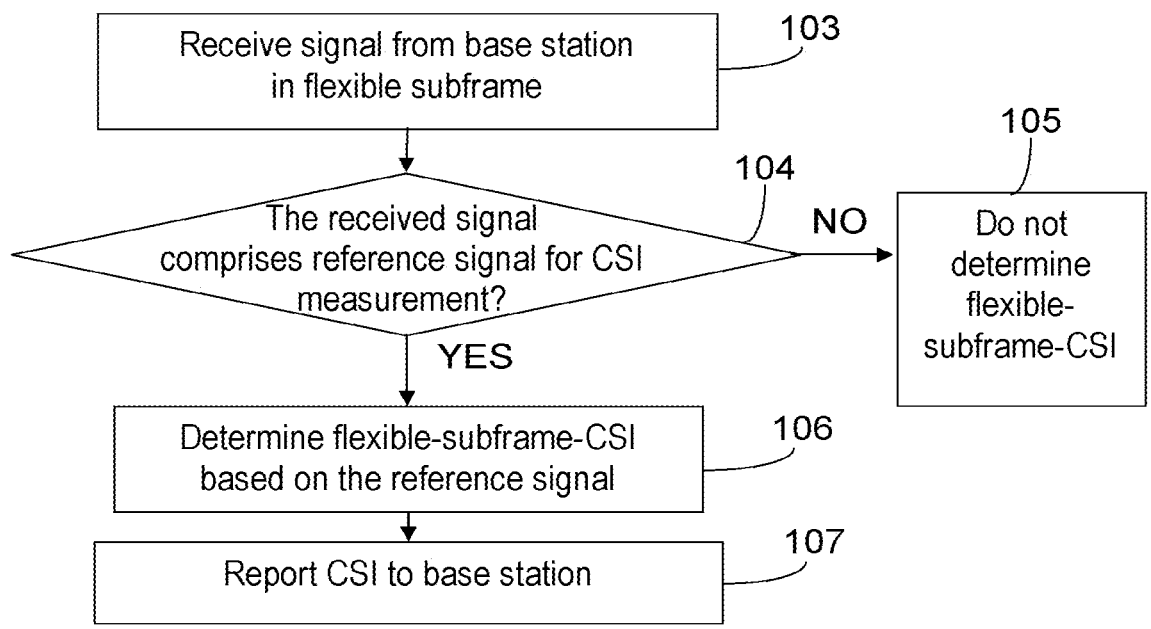
FIGS. 1-2 are flow charts illustrating procedures to be performed by a UE, according to exemplifying embodiments.

FIG. 1, illustrates the method comprising receiving 103 a signal from a base station in a flexible subframe, and determining 104 whether a reference signal for CSI measurement is comprised in the received signal. The method further comprises determining 106 CSI for the flexible subframe based on the reference signal when such a reference signal is comprised in the received signal. That is, no CSI is determined 105 for the flexible subframe when no reference signal for CSI measurement is comprised in the received signal. The method further comprises reporting 107 the determined CSI to the base station.

The UE receives a signal in a flexible subframe. The signal has been transmitted by a base station in a cell in which the UE is located. The base station may be the serving base station, to which the UE is connected. The UE is assumed to have information on which subframes that are flexible subframes and which are not. Such information may e.g. be provided to the UE by the network. The information on which subframes that are flexible subframes and which are not is not expected to change or vary much over time, but to be at least quasi-static. That is, it may be changed, but it probably will not be changed very often, if at all.

The determining of whether a reference signal for CSI measurement is comprised in the received signal may be performed in different ways, and will be further described below.

By "reference signal for CSI measurement" is here meant a signal such as a CRS, a CSI-RS or some other sequence, which is known to the UE, and thereby may be used for estimating e.g. channel conditions. The position of the reference signal, in terms of transmission resources, may be known to the UE. However, it is not necessarily known to the UE whether a reference signal is to be transmitted or not. Further, it is not necessarily known to the UE whether the flexible subframe is configured for uplink or downlink communication, since the configuration e.g. may be changed on a dynamic basis by the network, without notifying the UE.

The determining of CSI based on the reference signal may be performed by use of known methods therefore. Thus, when it is determined that the received signal comprises a reference signal for CSI measurement, CSI is determined based on the reference signal by use of a therefore suitable method. When the received signal is configured for downlink communication, but does not comprise a reference signal, no CSI is determined or calculated by the UE. When the flexible subframe is configured for uplink communication, no signal will be received from the base station during the flexible subframe. Thus, in this case, no CSI will be determined.

When CSI has been determined based on the received reference signal, the determined CSI is reported to the base station. This may be done in different ways, which will be described further below.

The method described above enables determining of CSI which is valid for flexible subframes in a wireless communication system applying time division duplex, TDD. The method is applicable for legacy systems and new LTE systems comprising a new carrier type, NCT. The method is further applicable in systems where the TDD UL/DL configuration is dynamically changed, and the UE does not know whether a certain subframe in a current radio frame is configured for uplink or downlink communication. Further, the above described method enables the network to dynamically determine which flexible subframe that should be used for CSI measurement according to certain factors that impact the experienced radio qualities in flexible subframes, e.g., neighboring cell scheduling activities and uplink downlink subframe configurations. This is a big advantage of the method. The method enables that CSI measurement and the reporting of CSI for normal and flexible subframes may be well settled, and thus that a very adequate CSI may be used when scheduling a UE in a flexible subframe. Further, it improves also CSI in non-flexible subframes, as measurements done in flexible subframes are not allowed to deteriorate the CSI for the non-flexible subframes.

The determining of whether a reference signal is comprised in the received signal may comprise estimating a correlation between a known reference signal/sequence for CSI measurement and the received signal. That is, a correlation between the known sequence and a sequence comprised in the received signal may be calculated. When the position of a potential reference signal/sequence in the received signal is known, the known sequence may be compared only to the sequence in the position where a reference signal would be located if present.

An estimated or determined correlation between a known reference signal/sequence and a potential reference signal/sequence in the received signal, e.g. in the RE positions in which a reference sequence for CSI measurement would be carried when transmitted by the base station, may be compared to a threshold value in order to determine whether the received signal, e.g. in said RE positions, corresponds to the known reference sequence, and thus comprises a reference signal/sequence for CSI measurement. The threshold value may be selected such that it is exceeded when there is a high probability for a match between the known sequence and the received signal in the RE positions in which a reference sequence for CSI measurement would be carried if transmitted by the base station. Such a threshold or limit may be predefined or configured by the network e.g. via RRC signaling, MAC control element, PDCCH order, or similar.

Further, the base station can enable, disable and/or reconfigure the UE to measure and report the CSI according to the determination of reference signal existence e.g. via RRC signaling, MAC control element, PDCCH order, or some other type of indicator.

Figure 2:
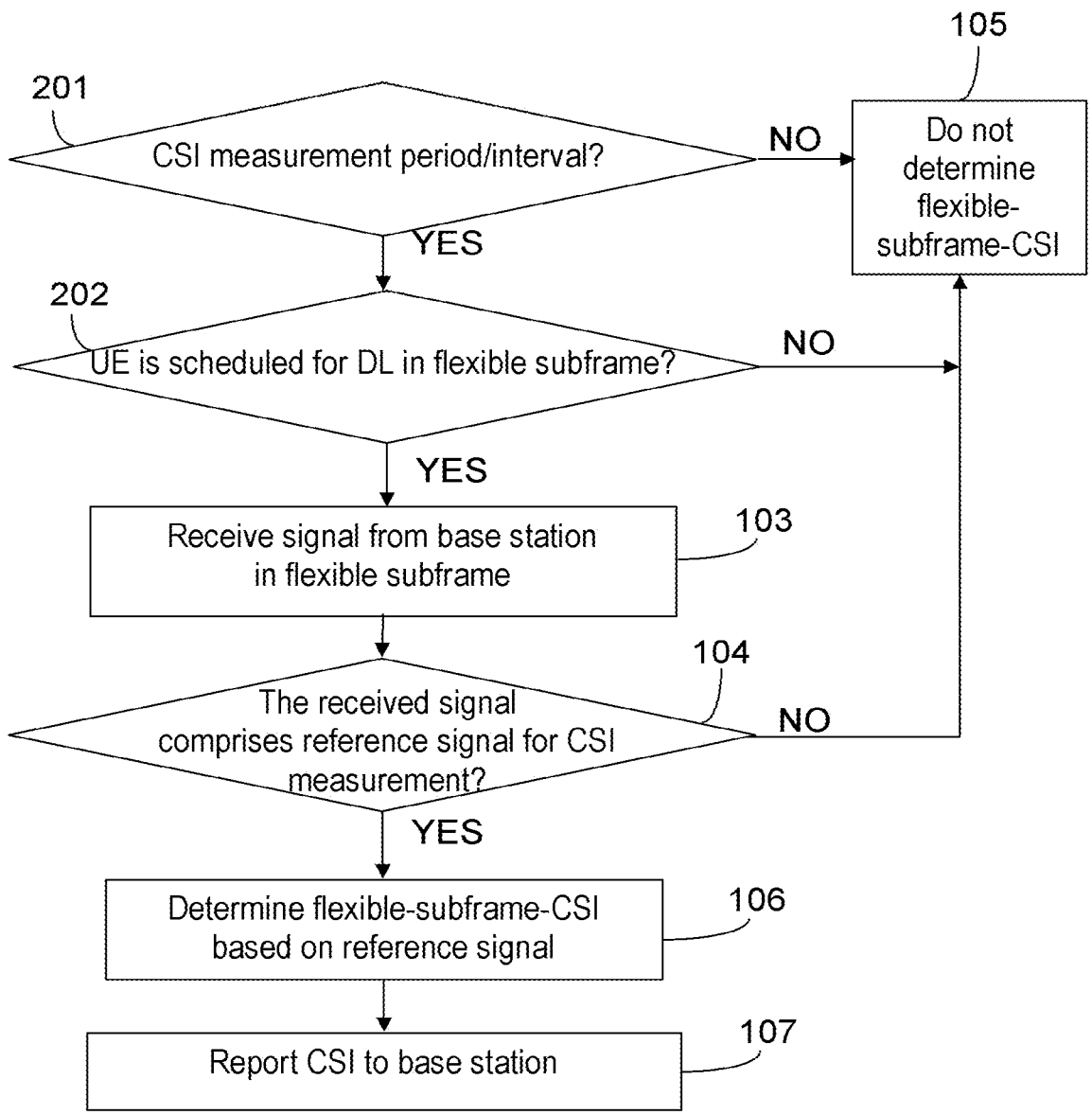

Rules may be set for when, e.g. during which periods, CSI should be determined by the UE. In some embodiments, the determining of CSI may be performed only during therefore configured intervals. The UE would then be informed of during which intervals, e.g. in time and/or frequency, it should search for a reference signal in signals transmitted from a base station in flexible subframes. Thereby, the UE may be passive in regard of CSI determining outside the configured intervals, and thus energy may be saved. In FIG. 2, this alternative is illustrated as action 201.

Further or alternatively, the determining of CSI may be performed when the UE is scheduled for downlink communication in the flexible subframe and not when it is not scheduled for downlink communication in the flexible subframe in question. If applying this strategy, the base station should schedule the UE for downlink communication in a flexible subframe in order to receive CSI for said flexible subframe. However, a reference signal is not necessarily included in each flexible subframe in which the UE is scheduled for downlink communication. The solution works also in this case, but is not as needed, as the UE, when being scheduled in a subframe, would know the transmit direction of the subframe. In FIG. 2, this alternative is illustrated as action 202.

The reporting of determined CSI may be performed in a therefore configured uplink resource. The resource may be configured to be reserved for reports of CSI related to flexible subframes or configured to be shared between reports of CSI related to flexible subframes and reports of CSI related to non-flexible subframes. That is, the UE may report the determined CSI in an uplink resource, in which it is scheduled for this purpose. When the resources are dedicated for report of CSI related to flexible subframes, the information transmitted by the UE in this resource is interpreted as CSI for flexible subframes by the base station. When the resource may be used for either CSI related to flexible subframes or CSI related to non-flexible subframes, i.e. for both types of CSI, the UE and base station must know, and agree on, when one or the other is transmitted. This will be further described below.

The determined CSI may be reported to the base station in one or more therefore configured uplink resources. For example, the CSI may be reported until a predefined time period has elapsed after the determining of the CSI. That is, when CSI related to flexible subframes has been determined, this CSI may be reported/transmitted to the base station in uplink resources reserved for this purpose until a predefined time period has elapsed, e.g. since the determining of the CSI. Such a time period may be controlled by a timer or some other time threshold or limit. Alternatively, the CSI may reported a predefined number of times after it has been determined, e.g. 1-4 times. Alternatively, the determined CSI may be reported in uplink resources reserved for this purpose until a new more recent CSI has been determined, which will be reported instead of the old one. One or more of the alternatives above may be applied simultaneously, e.g. the determined CSI is reported until one of the alternatives is fulfilled, and then the reporting of that particular CSI is stopped.

Figure 3:
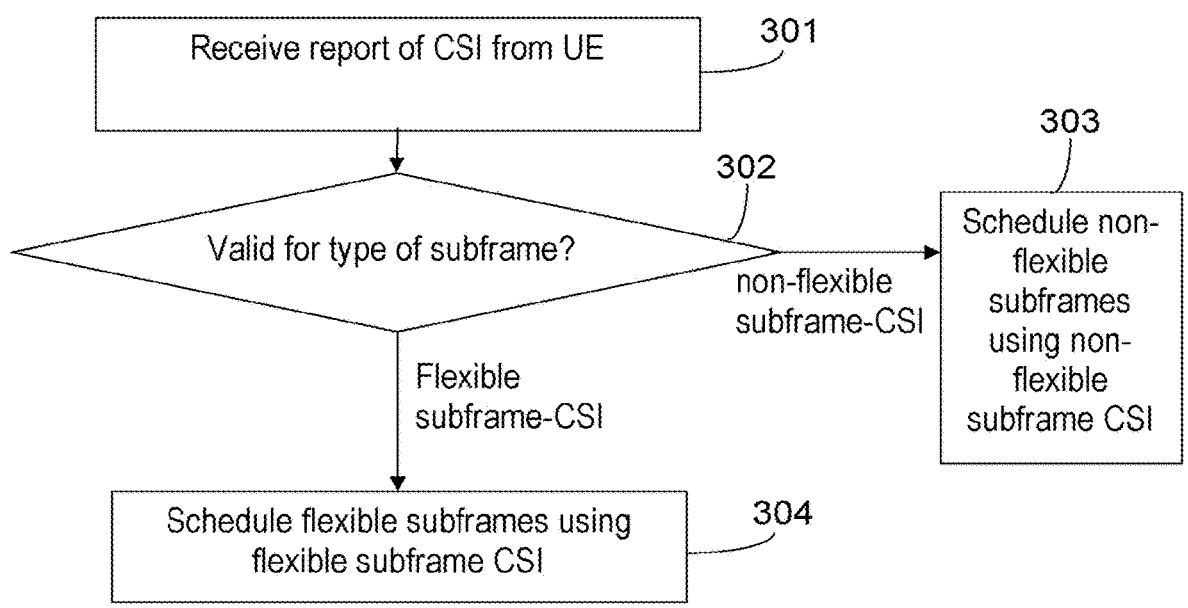
FIG. 3 is a flowchart illustrating an exemplary procedure to be performed by a base station according to an exemplifying embodiment.

Embodiments herein also relate to a method performed by a base station in a wireless communication system applying time division duplex, TDD. The base station may be e.g. an eNB in an LTE-type system. By LTE-type system is meant e.g. LTE and later developments thereof, or other OFDM-based systems applying dynamic TDD in a similar manner as described herein. The method performed by the base station is suitable for receiving separate channel state information, CSI, related to flexible subframes. The term "separate" has the same meaning as indicated above. Such a method will now be described with reference to FIG. 3. FIG. 3 illustrates the method comprising receiving 301 a report of CSI from a UE, in an uplink resource configured to be shared between reports of CSI related to flexible subframes and reports of CSI related to non-flexible subframes. The method further comprises determining 302 whether the reported CSI is related to flexible subframes or to non-flexible subframes, and scheduling, 304 a transmission in a flexible subframe based on the received CSI when the received CSI is related to flexible subframes.

The CSI is received in an uplink resource which may comprise both reports of CSI for flexible subframes and reports of CSI for non-flexible or normal subframes. Thus, the base station should determine which type of CSI that has been received; CSI for a flexible subframe or CSI for a non-flexible subframe. This may be determined in a number of ways, which will be further described below.

When a received CSI is determined to be related to a flexible subframe, the received CSI is used when scheduling a transmission in a flexible subframe for the UE. When a received CSI is related to non-flexible subframes, the CSI is instead used when scheduling a transmission in a non-flexible subframe. This is illustrated as action 303 in FIG. 3.

The method described above enables that CSI measurement and the reporting of CSI for normal and flexible subframes may be well settled, and thus a very adequate CSI may be used when scheduling a UE in a flexible subframe. Further, a very adequate CSI may be used when scheduling a UE in a non-flexible subframes.

The determining of whether the reported CSI is related to flexible subframes or to non-flexible subframes may be based on one or more of: whether a flexible-subframe-CSI measurement was triggered by the base station, whether a reference signal has been transmitted in a flexible subframe within a certain period of time, and whether a certain time period has elapsed since the last report of a flexible-subframe-CSI. The expression "flexible-subframe-CSI measurement" refers to CSI measurement performed, or to be performed, in a flexible subframe. The term "flexible-subframe-CSI" refers to CSI concerning a flexible subframe.

The first alternative related to the base station triggering a flexible-subframe-CSI measurement may involve any type of trigger used by the base station in order to induce a flexible-subframe-CSI measurement in the UE. For example, including a reference signal in a flexible subframe in which the UE is scheduled for downlink communication may constitute a trigger. Alternative triggers may be explicit or implicit instructions to perform CSI measurement e.g. in a certain flexible subframe or for one or more flexible subframes during a certain time period or periodically. That is, a reported CSI, which is received in response to the transmission of a certain trigger, may be interpreted as CSI for flexible subframes by the base station. For example, The CSI report may be required to have been received within a certain time interval starting after or at the transmission of the trigger and ending after a predefined period of time.

The second alternative related to whether a reference signal has been transmitted in a flexible subframe within a certain period of time may be considered as a variant of the first alternative when regarding the transmitted reference signal as a trigger. In this case, a received CSI report may be interpreted as CSI for flexible subframes by the base station when the report arrives in a certain time interval after a reference signal, which would be received by the UE, has been transmitted in a flexible subframe.

The third alternative is related to whether a certain time period has elapsed since the last report of a flexible-sub-frame-CSI. Here, the CSI related to flexible and the CSI related to non-flexible subframes may be multiplexed by the UE according to a scheme, which is known to the base station and the UE. For example, every second or third CSI may be related to flexible subframes and remaining CSI may be related to non-flexible subframes. It may be explicitly indicated e.g. at certain intervals which type that is sent in a certain resource, or which position or part in the multi-plexing scheme that is currently executed.

Figure 4:
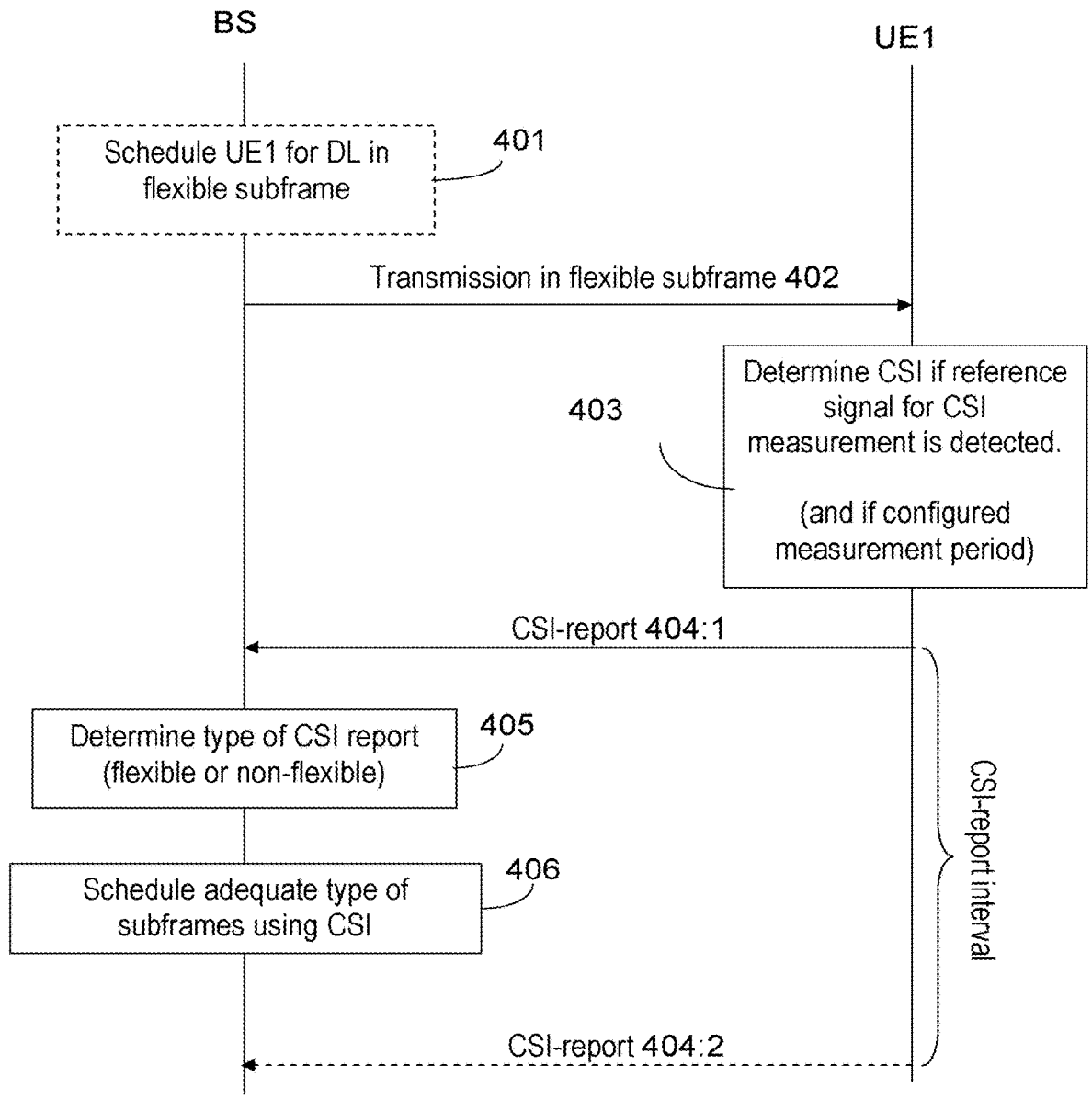
FIG. 4 illustrates signaling flows between a base station and a UE in an exemplifying embodiment
Figure 5:
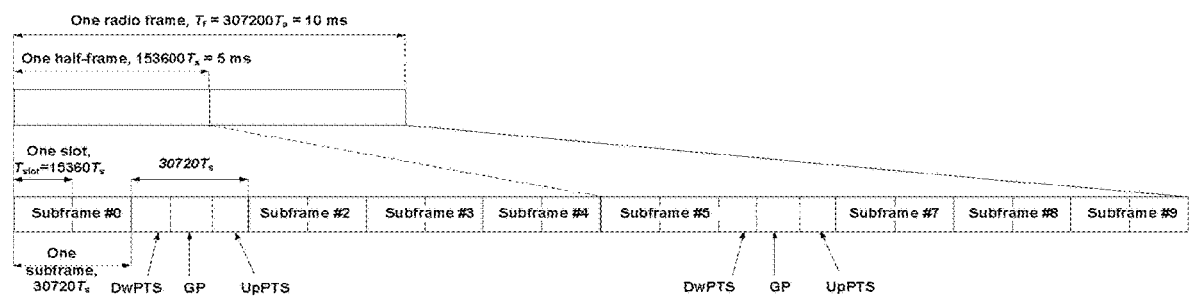
FIG. 5 illustrates an LTE frame structure type 2.
Figure 6:
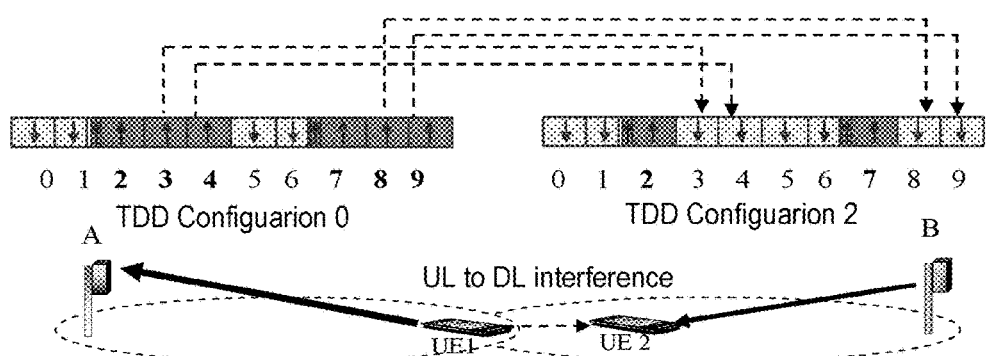
FIG. 6 illustrates uplink to downlink interference in flexible subframes.

FIG. 4 illustrates an exemplifying signaling scheme, where a transmission 402 is made by a base station in a flexible subframe. A UE, UE1, determines, 403, CSI for the flexible subframe in case the transmission comprises a reference signal for CSI measurements. The UE then sends a CSI-report 404:1 to the base station, which may determine 405, which type of CSI-report that has been received, and schedules 406 and adequate type of subframe using the received CSI.

Below, some examples of CSI measurements in flexible downlink subframes will be given. The term "tentative CSI measurements" will be used below to indicate that the UE does not need to know whether a signal received in a flexible subframe actually comprises a reference signal or not. The UE may thus be configured to perform CSI measurements in a tentative manner. Examples are given below for legacy carrier type and new carrier type respectively.

Example 1: CSI Measurement in Legacy Carrier Type (CRS Based)

Figure 7:
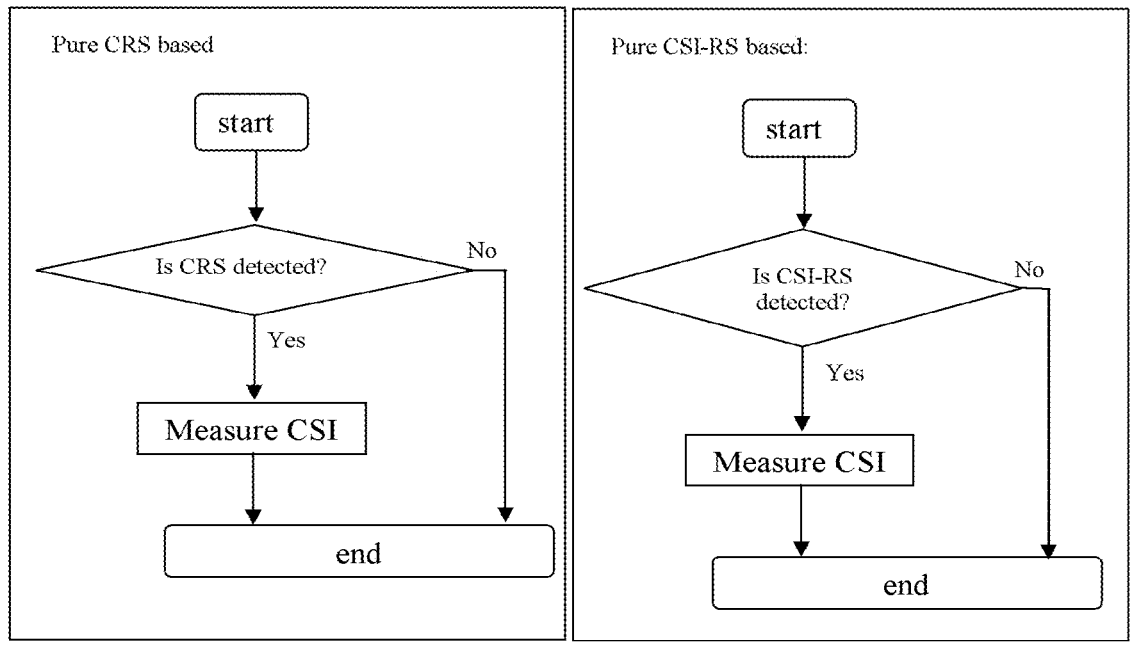
FIG. 7 illustrates CSI measurement in flexible subframes for traditional and new carrier type respectively.

The CSI measurement is done upon detecting of CRS and/or CSI-RS existence. There can be two different situations:

Assume the CSI is measured based on the CRS only
When the UE is required to do CSI measurement in a flexible subframe, e.g. either when a periodic CSI measurement instance fall into the flexible subframes or an aperiodic CSI measurement is triggered in the flexible subframe, the UE tentatively checks if there is downlink CRS transmission existing in the flexible subframes. If a CRS is detected in a flexible subframe, the UE then estimates CSI based on the channel estimated from the detected CRS. If no CRS transmission is detected, the UE does not estimate the CSI. The CRS power may be determined based on the correlation between the CRS symbol and the received signals in the CRS RE (Resource Element)

position. The CRS transmission may be determined if the CRS power is higher than a predetermined threshold A. An exemplifying flow chart is illustrated in the left part of FIG. 7.

Assume the CSI is measured based on the CSI-RS
When there is CRS transmission when the CSI-RS is transmitted, a UE can firstly determine if CRS transmission exists according to the previous paragraph. If CRS transmission is determined, the UE further determines if the CSI-RS transmission occurs based on the CSI-RS power. If no CRS transmission is detected, the UE does not do CSI estimation for the present flexible subframe. Similarly, the CSI-RS power may be estimated by the correlation between the CSI-RS symbol and the received signals in the CSI-RS RE position. The CSI-RS transmission may be determined if the CSI-RS power is higher than another threshold B. Once the CSI-RS is detected, the UE estimates CSI based on the CSI-RS. Otherwise the UE does not do CSI estimation for the present flexible subframe.

Alternatively, the UE may monitor the CSI-RS existence without relying on the existence detection of CRS, i.e. the CSI estimation may be done when the CSI-RS power is higher than certain predetermined threshold according to the channel measurement based on CSI-RS. The UE does not estimate CSI when no CSI-RS transmission is detected. An exemplifying flow chart is illustrated in the right part of FIG. 7.

In a layer-1 signaling enabled dynamic TDD, the UE should monitor the downlink scheduling assignment and/or uplink scheduling grant in a flexible subframe anyway, and the CRS should be monitored. This means the CSI measurement does not increase complexity.

Example 2: CSI Measurement in New Carrier Type (No CRS)

The CSI measurement is done upon detecting of CSI-RS existence similarly as mentioned in the previous example. When the dynamic TDD capability is enabled, the UE tentatively check if there is downlink CSI-RS in the flexible subframes. If CSI-RS is detected in a flexible subframe, the UE estimates CSI based on the channel measurement estimated from the CSI-RS. Otherwise, there is no CSI estimation action for the present flexible subframe. An exemplifying flow chart is illustrated in the right part of FIG. 7.

A UE may perform CSI measurement for the flexible subframes e.g. only when it is scheduled for downlink data reception in the flexible subframes. One example is presented for periodical and aperiodic CSI measurement respectively:

Given that periodic CSI report is configured, the UE may measure CSI in certain, e.g. first or last, scheduled flexible subframes for downlink data received in each CSI measurement period;

Given that aperiodic CSI report is configured, the UE may measure CSI at the first scheduled flexible subframe for downlink data receiving after receiving the order for CSI measurement.

Differentiated CSI Measurement and Reporting

According to this exemplifying embodiment, the CSI for the normal or non-flexible and flexible downlink subframes are reported separately for a UE. The eNB schedules the UE based on the corresponding CSI to the downlink subframe type, i.e. flexible or normal, accordingly. One example is presented below:

Example 1: Separate periodical CSI report loop for normal and flexible subframes, i.e., time multiplexed.

Figure 8:
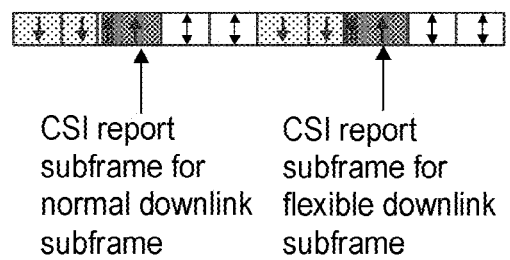
FIG. 8 illustrates and example of CSI reporting by dual loop report.

An example is illustrated in FIG. 8. The CSI for normal downlink subframes is reported in a configured uplink subframe, subframe 2 in FIG. 8, and the CSI for flexible downlink subframes is reported in another uplink subframe, subframe 7 in FIG. 8. When there is no new CSI for flexible subframes when the CSI reporting subframe is due, the UE may send the most recently estimated CSI or apply DTX (Discontinuous Transmission). By DTX is here meant discontinuous transmission in the sense that "nothing" is transmitted when a CSI report could have been sent. On the other hand, the UE could also send a reserved indicator to inform the eNB that there is no valid CSI report at this time.

Example 2: Event triggered CSI report by sharing the present CSI report resource Still the present CSI report loop(s) may be reused or shared in a predefined way. As one example, the CSI report for normal and flexible subframes may be based on a predefined preemption policy. For instance, the UE may report the CSI for the flexible subframes if there is newly estimated CSI for the flexible subframes within X-ms from the present CSI report subframe. X may be predetermined or configured by the network. If there is no newly estimated CSI for the flexible subframes within X-ms before the CSI reporting subframe, the CSI for normal downlink subframes is reported instead. The eNB may determine if the received CSI is for normal or downlink subframes based on if there are CSI-RS transmitted within X-ms before reception of the CSI report. This method may be preferred for CSI-RS based CSI measurement for flexible subframes. The eNB may configure a CSI-RS transmission in a flexible subframe when the eNB wants a CSI report for the flexible subframe.

Embodiments described herein also relate to a UE operable in a wireless communication system applying time division duplex, TDD. The UE is adapted or configured to perform at least one embodiment of the method described above. The UE is associated with the same technical features, objects and advantages as the method described above and illustrated e.g. in FIGS. 1-2 and 4. The UE will be described in brief in order to avoid unnecessary repetition.

Figure 9:
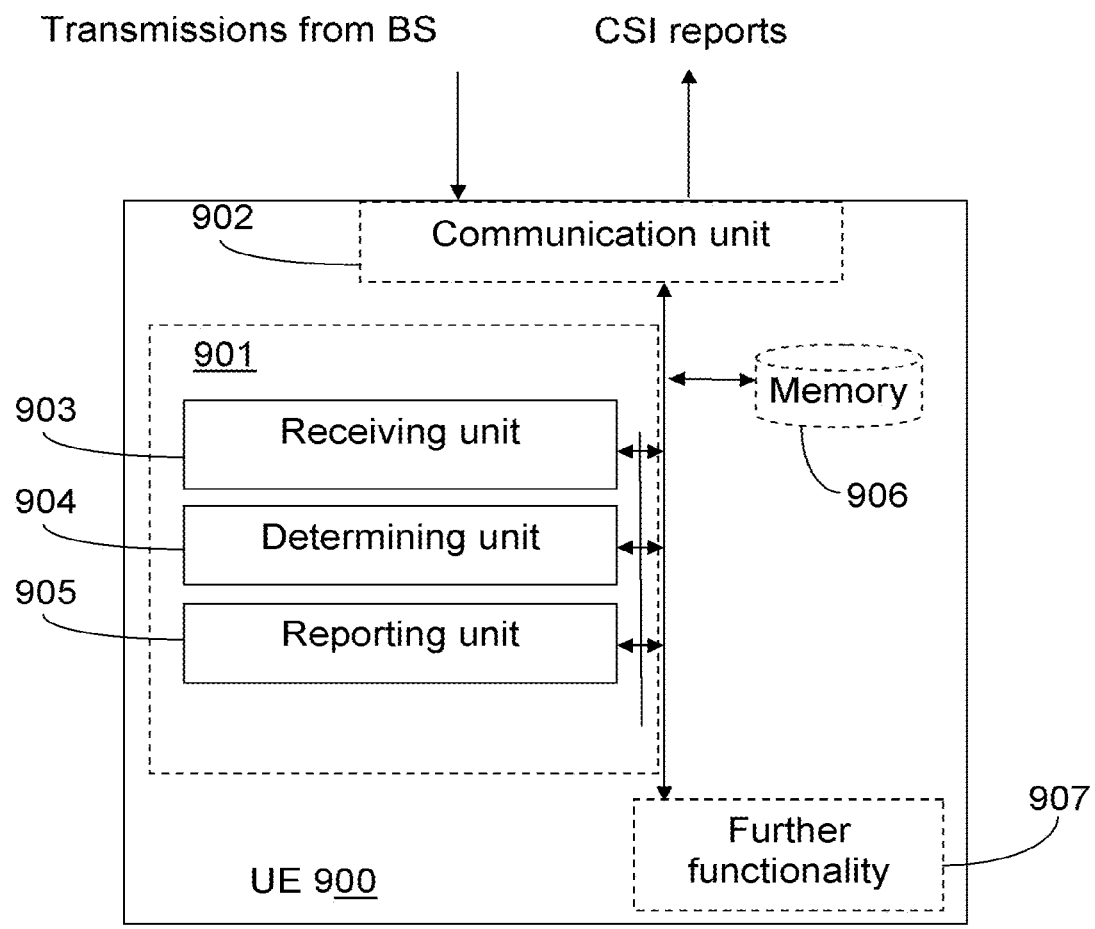
FIGS. 9-11 are block schemes illustrating arrangements according to exemplifying embodiments.

Below, an exemplifying UE 900, adapted or configured to enable the performance of an above described method for determining separate channel state information, CSI, for a flexible subframe will be described with reference to FIG. 9. The part of the UE which is most affected by the adaptation to the herein described method is illustrated as an arrangement 901, surrounded by a dashed line. The UE could be configured to be operable, e.g. in an LTE and/or WCDMA system or in a multi-RAT system. The UE 900 and arrangement 901 are further configured to communicate with other entities via a communication unit 902 which may be regarded as part of the arrangement 901. The communication unit comprises means for wireless communication such as one or more receivers, transmitters and/or transceivers. The arrangement or network node may further comprise other functional units 907, such as e.g. functional units providing regular UE functions, and may further comprise one or more storage units 906.

Figure 9B:
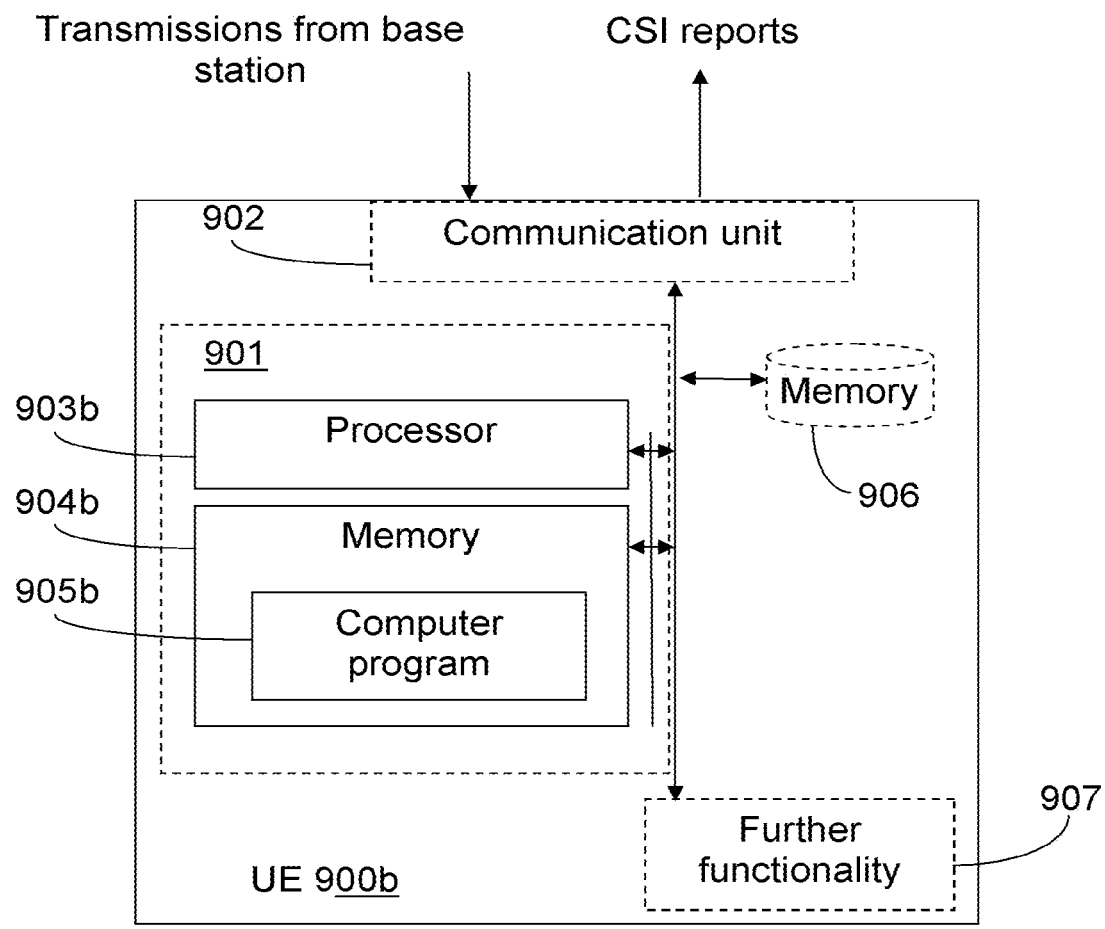

The arrangement 901 could be implemented e.g. by one or more of: a processor or a micro processor and adequate software and memory for storing of the software, a Programmable Logic Device (PLD) or other electronic component(s) or processing circuitry configured to perform the actions described above, and illustrated e.g. in FIG. 1. FIG. 9b illustrates an exemplifying implementation comprising a processor 903b, a memory 904b and software 905b.

The arrangement part 901 of the UE may be implemented and/or described as follows:

The UE comprises a receiving unit 903, adapted or configured to receive a signal from a base station in a flexible subframe. The UE further comprises a determining unit 904, adapted or configured to determine whether a reference signal is comprised in the received signal; and further adapted or configured to determine CSI for the flexible subframe based on the reference signal when a reference signal is comprised in the received signal. This could also be described as that the determining unit 904 is adapted or configured to determine, when a reference signal for CSI measurement is comprised in the received signal, CSI for the flexible subframe based on the reference signal. The UE further comprises a reporting unit 905, adapted or configured to report the determined CSI to the base station.

The determining of whether a reference signal for CSI measurement is comprised in the received signal may comprise estimating a correlation between a known reference signal/sequence and a sequence of the received signal.

The determining of whether a reference signal for CSI measurement is comprised in the received signal may further comprise comparing the estimated correlation with a threshold value.

Further, the determining of CSI may be performed e.g. only during therefore configured intervals.

The determining of CSI may be performed e.g. only when the UE is scheduled for downlink communication in the flexible subframe.

The reporting may be performed in an uplink resource configured to be reserved for reports of CSI related to flexible subframes and/or an uplink resource which is configured to be shared between reports of CSI related to flexible subframes and reports of CSI related to non-flexible subframes.

The determined CSI may be reported by the UE to the base station in one or more therefore configured uplink resources until at least one of the following is fulfilled: a predefined time period has elapsed after the determining of the CSI; the CSI has been reported a predefined number of times; and, a more recent CSI for a flexible subframe is determined.

The reference signal for CSI measurement mentioned above may be e.g. a so-called Cell-specific Reference Signal, CRS, or a CSI-Reference Signal, CSI-RS.

Embodiments described herein also relate to a base station operable in a wireless communication system applying time division duplex, TDD. The base station is adapted or configured to perform at least one embodiment of the method described above. The base station is associated with the same technical features, objects and advantages as the method described above and illustrated e.g. in FIG. 3. The base station will be described in brief in order to avoid unnecessary repetition.

Figure 10:
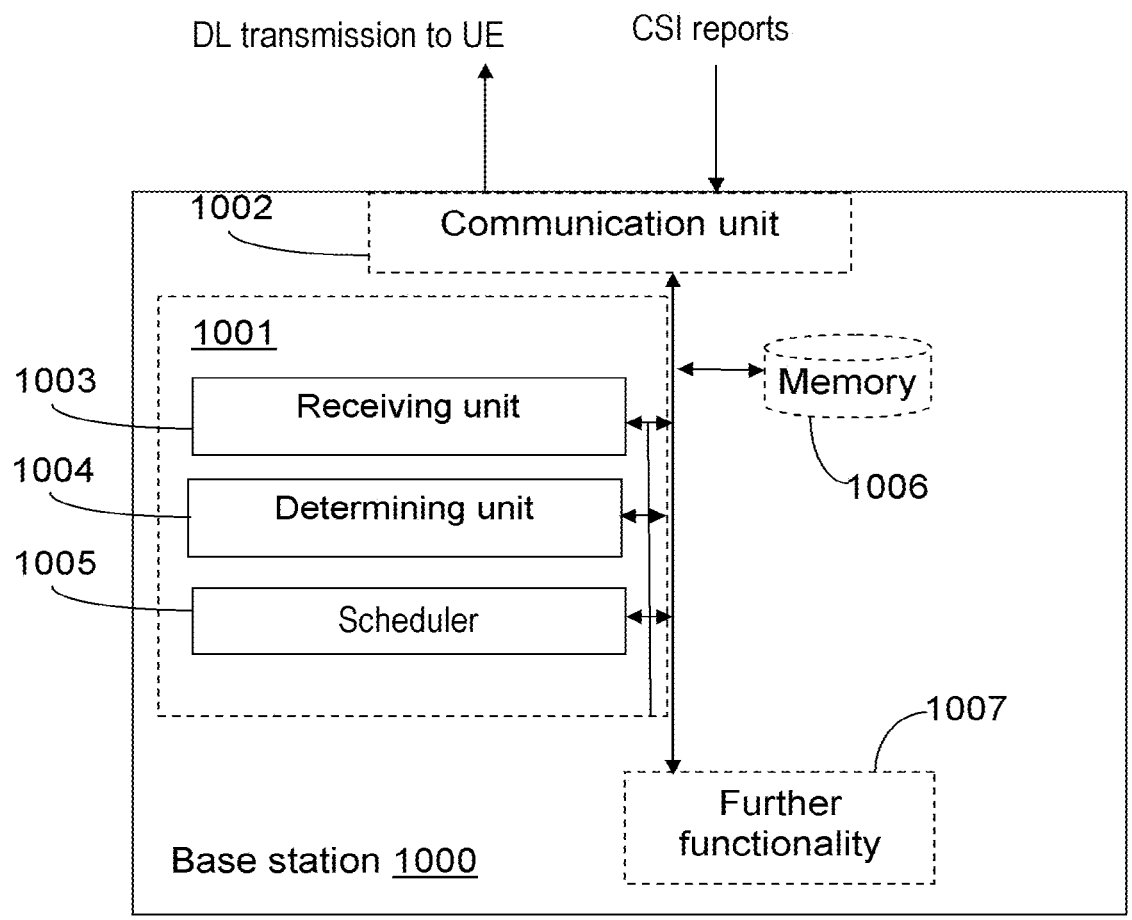

Below, an exemplifying base station 1000, adapted or configured to enable the performance of an above described method for mobility procedures will be described with reference to FIG. 10. The part of the base station which is most affected by the adaptation to the herein described method is illustrated as an arrangement 1001, surrounded by a dashed line. The base station could be e.g. an eNB, or a NodeB, depending on in which type of communication system it is operable, e.g. LTE-type systems. The base station 1000 and arrangement 1001 is further configured to communicate with other entities via a communication unit 1002 which may be regarded as part of the arrangement 1001. The communication unit comprises means for wireless communication, and may comprise means for e.g. wired communication. The arrangement or base station may further comprise other functional units 1007, such as e.g. functional units providing regular eNB functions, and may further comprise one or more storage units 1006.

The arrangement 1001 could be implemented e.g. by one or more of: a processor or a micro processor and adequate software and memory for storing of the software, a Programmable Logic Device (PLD) or other electronic component(s) or processing circuitry configured to perform the actions described above, and illustrated e.g. in FIG. 3.

The arrangement part of the base station may be implemented and/or described as follows:

The base station comprises a receiving unit 1003, adapted or configured to receive a report of CSI from a UE in an uplink resource configured to be shared between reports of CSI related to flexible subframes and reports of CSI related to non-flexible subframes. The base station further comprises a determining unit 1004, adapted or configured to determine whether the reported CSI is related to flexible subframes or to non-flexible subframes; and further comprises a scheduler 1005, adapted or configured to schedule a transmission in a flexible subframe based on the received CSI when the received CSI is related to flexible subframes.

The determining may based on one or more of: whether a flexible-subframe-CSI measurement was triggered by the base station; whether a reference signal has been transmitted in a flexible subframe within a certain period of time; and, whether a certain time period has elapsed since the last report of a flexible-subframe-CSI.

The base station may be e.g. an eNB in an LTE-type communication system.

Figure 11:
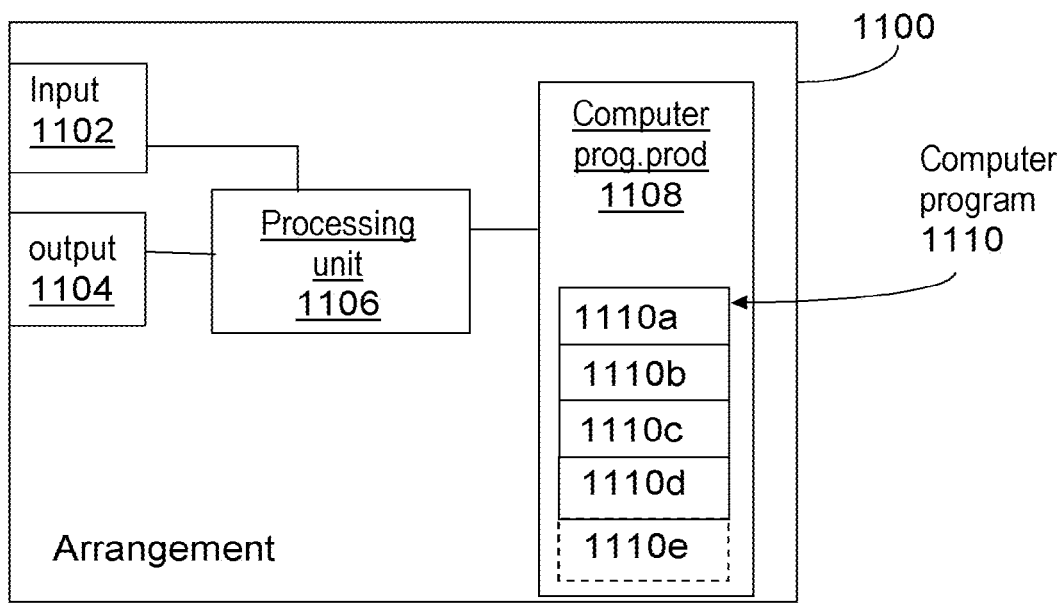

FIG. 11 schematically shows an embodiment of an arrangement 1100 which may be used in a UE 900. Comprised in the arrangement 1100 are here a processing unit 1106, e.g. with a DSP (Digital Signal Processor). The processing unit 1106 may be a single unit or a plurality of units to perform different actions of procedures described herein. The arrangement 1100 may also comprise an input unit 1102 for receiving signals from other entities, and an output unit 1104 for providing signal(s) to other entities. The input unit and the output unit may be arranged as an integrated entity or as illustrated in the example of FIG. 11.

Furthermore, the arrangement 1100 comprises at least one computer program product 1108 in the form of a non-volatile or volatile memory, e.g. an EEPROM (Electrically Erasable Programmable Read-Only Memory), a flash memory and a hard drive. The computer program product 1108 comprises a computer program 1110, which comprises code/computer readable instructions, which when executed by the processing unit 1106 in the arrangement 1100 causes the arrangement 1100 and/or the UE in which it is comprised to perform the actions e.g. of the procedure described earlier in conjunction with FIG. 1.

The computer program 1110 may be configured as a computer program code structured in computer program modules 1110a-1110e. Hence, in an exemplifying embodiment, the code in the computer program of the arrangement 1100 comprises a receiving module 1110a, for receiving a signal from a base station. The computer program further comprises a determining module 1110b, for determining whether a reference signal is comprised in the received signal. The computer program further comprises a further determining module 1110c, for determining CSI for the flexible subframe based on the reference signal when a reference signal is comprised in the received signal. The computer program may further comprise a reporting module 1110d, for reporting the determined CSI to the base station. The computer program may comprise further modules, illustrated as module 1110e, e.g. for controlling and performing other related procedures associated with determining of CSI.

The computer program modules could essentially perform the actions of the flow illustrated in FIG. 1, to emulate the arrangement 901 in the UE 900. In other words, when the different computer program modules are executed in the processing unit 1106, they may correspond e.g. to the units 903-905 of FIG. 9.

It is to be understood that corresponding arrangements, as the one for a UE described above, could be implemented also for a base station. The structure could be the same, but the computer program modules would then be arranged to comprise code, which when executed in the processing unit would perform or trigger the performing of the actions described e.g. in conjunction with FIG. 3 above.

Although the code means in the embodiments disclosed above in conjunction with FIG. 11 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the UE or base station.

It is to be understood that the choice of interacting units, as well as the naming of the units within this disclosure are only for exemplifying purpose, and nodes suitable to execute any of the methods described above may be configured in a plurality of alternative ways in order to be able to execute the disclosed procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and studying of the drawings. It is therefore intended that the following appended claims include such alternatives, modifications, permutations and equivalents as fall within the scope of the embodiments.

Those skilled in the art will appreciate that the functions and means explained herein may be implemented using software functioning in conjunction with a programmed microprocessor or general purpose computer, and/or using an application specific integrated circuit (ASIC). It will also be appreciated that while embodiments of the invention are primarily described in the form of methods and nodes, they may also be embodied in a computer program product as well as in a system comprising a computer processor and a memory coupled to the processor, wherein the memory is encoded with one or more programs that may perform the functions disclosed herein.

Abbreviations

CSI Channel state information
CQI Channel quality indicator
MIIT Ministry of Industry and Information Technology
SINR Signal to Interference and Noise Ratio
TDD Time Division Duplex
UE User Equipment
UL uplink
DL Downlink
LTE Long Term Evolution
PMI Precoding matrix indicator
RI Rank indicator

The invention claimed is:

1. A method performed by a User Equipment (UE), the method comprising:
receiving a signal from a base station within a flexible subframe;
determining, based on estimating a correlation between a known reference sequence and a sequence of the received signal in Resource Element (RE) positions, a power of a reference signal for a Channel-State-Information (CSI) measurement;
determining, based on the determined power of the reference signal, whether the reference signal is comprised in the received signal;
determining CSI for the flexible subframe based on the reference signal after it is determined that the reference signal is comprised in the received signal; and
reporting the determined CSI to the base station;
wherein determining of whether a reference signal for CSI measurement is comprised in the received signal may further comprise comparing the estimated correlation with a correlation threshold value; and
wherein in response to that the correlation between the known reference sequence and the sequence of the received signal in RE positions exceeds the correlation threshold value, the UE performs determining of the power of the reference signal for the CSI measurement.

2. The method according to claim 1, wherein the determining of the power of the reference signal is performed in response to determining that the UE is within an interval configured for determining CSI within flexible subframes.

3. The method according to claim 1, wherein the determining of the power of the reference signal is performed in response to determining that the UE is scheduled for downlink communication in the flexible subframe.

4. The method according to claim 1, wherein determining whether the reference signal is comprised in the received signal further comprises:
comparing the determined power of the reference signal to a threshold value; and
in response to the determined power of the reference signal being higher than the threshold value, determining that the reference signal is comprised in the received signal.

5. The method according to claim 1, wherein the reporting of the determined CSI is performed in one or more of:
an uplink resource configured to be reserved for reports of CSI related to flexible subframes; and
an uplink resource configured to be shared between reports of CSI related to flexible subframes and reports of CSI related to non-flexible subframes.

6. The method according to claim 1, wherein the determined CSI for the flexible subframe is reported to the base station in one or more uplink resources after at least one of the following is fulfilled:
a predefined time period has elapsed after the determining of the CSI for the flexible subframe,
the CSI has been reported a number of times, and
a more recent CSI for a subsequent flexible subframe is determined.

7. The method according to claim 1, wherein the reference signal for CSI measurement is a Cell-specific Reference Signal (CRS) or a CSI-Reference Signal (CSI-RS).

8. The method according to claim 1, wherein the flexible subframe is used in a wireless communication system applying time division duplex (TDD).

9. A User Equipment (UE), comprising:
a memory storing computer instructions; and
a processor configured to execute the computer instructions to:
receive a signal from a base station within a flexible subframe;
determine, based on estimating a correlation between a known reference sequence and a sequence of the received signal in Resource Element (RE) positions, a power of a reference signal for Channel-State-Information (CSI) measurement;
determine, based on the determined power of the reference signal, whether the reference signal is comprised in the received signal;
determine CSI for the flexible subframe based on the reference signal after it is determined that the reference signal is comprised in the received signal; and
report the determined CSI to the base station;
wherein determining of whether a reference signal for CSI measurement is comprised in the received signal may further comprise comparing the estimated correlation with a correlation threshold value; and
wherein in response to that the correlation between the known reference sequence and the sequence of the received signal in RE positions exceeds the correlation threshold value, the UE performs determining of the power of the reference signal for the CSI measurement.

10. The UE according to claim 9, wherein the processor is further configured to execute the computer instructions to:
determine the power of the reference signal in response to determining that the UE is within an interval configured for determining CSI within flexible subframes.

11. The UE according to claim 9, wherein the processor is further configured to execute the computer instructions to:
determine the power of the reference signal in response to determining that the UE is scheduled for downlink communication in the flexible subframe.

12. The UE according to claim 9, wherein the processor is further configured to execute the computer instructions to:

compare the determined power of the reference signal to a threshold value; and in response to the determined power of the reference signal being higher than the threshold value, determine that the reference signal is comprised in the received signal.

13. The UE according to claim 9, wherein the processor is further configured to execute the computer instructions to report the determined CSI to the base station in one or more of:

an uplink resource configured to be reserved for reports of CSI related to flexible subframes; and an uplink resource configured to be shared between reports of CSI related to flexible subframes and reports of CSI related to non-flexible subframes.

14. The UE according to claim 9, wherein the processor is further configured to execute the computer instructions to report the determined CSI to the base station in one or more uplink resources after at least one of the following is fulfilled:

a predefined time period has elapsed after the determining of the CSI for the flexible subframe, the CSI has been reported a number of times, and a more recent CSI for a subsequent flexible subframe is determined.

15. The UE according to claim 9, wherein the reference signal for CSI measurement is a Cell-specific Reference Signal (CRS) or a CSI-Reference Signal (CSI-RS).

16. The UE according to claim 9, wherein the flexible subframe is used in a wireless communication system applying time division duplex (TDD).

17. A non-transitory computer-readable medium comprising a computer program code that, when executed by a processor coupled to a User Equipment (UE), causes the UE to perform operations comprising:

receiving a signal from a base station within a flexible subframe;

determining, based on estimating a correlation between a known reference sequence and a sequence of the received signal in Resource Element (RE) positions, a power of a reference signal for a Channel-State-Information (CSI) measurement;

determining, based on the determined power of the reference signal, whether the reference signal is comprised in the received signal;

determining CSI for the flexible subframe based on the reference signal after it is determined that the reference signal is comprised in the received signal; and reporting the determined CSI to the base station;

wherein determining of whether a reference signal for CSI measurement is comprised in the received signal may further comprise comparing the estimated correlation with a correlation threshold value; and wherein in response to that the correlation between the known reference sequence and the sequence of the received signal in RE positions exceeds the correlation threshold value, the UE performs determining of the power of the reference signal for the CSI measurement.

18. The non-transitory computer-readable medium according to claim 17, wherein the operations further comprise:

determining whether the UE is within an interval configured for determining CSI within flexible subframes; and in response to the UE being within the interval, determining the power of the reference signal.

19. The non-transitory computer-readable medium according to claim 17, wherein the operations further comprise:

determining whether the UE is scheduled for downlink communication in the flexible subframe; and in response to the UE being scheduled for downlink communication in the flexible subframe, determining the power of the reference signal.

20. The non-transitory computer-readable medium according to claim 17, wherein determining whether the reference signal is comprised in the received signal further comprises:

comparing the determined power of the reference signal to a threshold value; and in response to the determined power of the reference signal being higher than the threshold value, determining that the reference signal is comprised in the received signal.

* * * * *